(12) United States Patent
Acosta et al.

(10) Patent No.: US 9,514,489 B2
(45) Date of Patent: Dec. 6, 2016

(54) DYNAMIC TRANSFORMATION OF DISPLAY MEDIA BASED UPON A PROXIMITY-BASED COMMUNICATION PROTOCOL

(71) Applicant: Disney Enterprises, Inc., Burbank, CA (US)

(72) Inventors: Evan Acosta, La Crescenta, CA (US); Edward Drake, Stevenson Ranch, CA (US); Mark Arana, West Hills, CA (US); Leon Silverman, Encino, CA (US)

(73) Assignee: Disney Enterprises, Inc., Burbank, CA (US)

( * ) Notice: Subject to any disclaimer, the term of this patent is extended or adjusted under 35 U.S.C. 154(b) by 187 days.

(21) Appl. No.: 14/012,679

(22) Filed: Aug. 28, 2013

(65) Prior Publication Data

US 2014/0232615 A1    Aug. 21, 2014

Related U.S. Application Data

(60) Provisional application No. 61/766,065, filed on Feb. 18, 2013.

(51) Int. Cl.
*G09G 5/00*       (2006.01)
*G06Q 30/06*     (2012.01)
(Continued)

(52) U.S. Cl.
CPC ......... *G06Q 30/0631* (2013.01); *G06F 3/1423* (2013.01); *G06F 3/1438* (2013.01); *G06Q 30/0261* (2013.01); *G06Q 30/0267* (2013.01); *G06Q 30/0269* (2013.01); *G06Q 30/0623* (2013.01); *G06Q 30/0625* (2013.01);
(Continued)

(58) Field of Classification Search
CPC ...... G06F 3/1423; G06F 3/1454; G06F 3/147; G06F 1/1647; G06F 3/1438; G09G 2370/16; G09G 2380/04; G09G 2370/04; G09G 2370/10; G09G 5/006; H04M 1/7253; G06K 2017/0045; G06K 2017/0051; H04B 5/02; G06Q 20/203; G06Q 30/00; G06Q 30/02; G06Q 30/0261; G06Q 30/0267; G06Q 30/0269; G06Q 30/0623; G06Q 30/0625; G06Q 30/0631; G06Q 30/0639
(Continued)

(56) References Cited

U.S. PATENT DOCUMENTS

| 5,986,675 | A | 11/1999 | Anderson et al. |
| 6,050,695 | A * | 4/2000 | Fromm .............. A44C 15/0015 362/104 |

(Continued)

FOREIGN PATENT DOCUMENTS

| CN | 101312514 | 11/2008 |
| WO | 02071285 | 9/2002 |

OTHER PUBLICATIONS

Huang, English Abstract of CN 202617440U.*
http://www.youtube.com/watch?v=f43NGb8XRK4, Feb. 19, 2012.

*Primary Examiner* — Hong Zhou
(74) *Attorney, Agent, or Firm* — Patent Ingenuity, P.C.; Samuel K. Simpson

(57) ABSTRACT

A process detects, at a first proximity-based device within a first object, presence of a second proximity-based device within a second object. The presence is within a proximity. Further, the process modifies a first display associated with the first object based upon a second display associated with the second object.

17 Claims, 7 Drawing Sheets

(51) Int. Cl.
  *G06Q 30/02* (2012.01)
  *H04B 5/02* (2006.01)
  *G06F 3/14* (2006.01)
  *H04N 9/87* (2006.01)

(52) U.S. Cl.
  CPC ......... *G06Q 30/0639* (2013.01); *G09G 5/006* (2013.01); *H04B 5/02* (2013.01); *H04N 9/87* (2013.01); *G09G 2370/04* (2013.01); *G09G 2370/10* (2013.01); *G09G 2370/16* (2013.01)

(58) Field of Classification Search
  USPC ......... 345/156–173, 1.1–1.2, 2.1–2.3, 31, 30
  See application file for complete search history.

(56) References Cited

U.S. PATENT DOCUMENTS

| | | | |
|---|---|---|---|
| 6,222,807 | B1 | 4/2001 | Min-Jae |
| 7,663,488 | B2 | 2/2010 | Kalama et al. |
| 8,010,621 | B2 | 8/2011 | Zilliacus et al. |
| 2002/0109596 | A1* | 8/2002 | Phillips ............... G08B 1/08 340/573.1 |
| 2005/0111825 | A1 | 5/2005 | Yun |
| 2007/0037614 | A1 | 2/2007 | Rosenberg |
| 2007/0254674 | A1 | 11/2007 | Pedigo |
| 2008/0109309 | A1* | 5/2008 | Landau et al. ................. 705/14 |
| 2008/0134032 | A1 | 6/2008 | Pirnack |
| 2009/0085724 | A1 | 4/2009 | Naressi et al. |
| 2009/0157449 | A1 | 6/2009 | Itani |
| 2010/0004988 | A1 | 1/2010 | Matsuo |
| 2010/0010964 | A1 | 1/2010 | Skowronek et al. |
| 2010/0052934 | A1* | 3/2010 | Clegg ................. B42D 15/022 340/815.4 |
| 2010/0114983 | A1 | 5/2010 | Robert et al. |
| 2010/0136898 | A1 | 6/2010 | Farrow |
| 2010/0161434 | A1 | 6/2010 | Herwig |
| 2010/0174599 | A1 | 7/2010 | Rosenblatt et al. |
| 2010/0300913 | A1 | 12/2010 | Goldburt |
| 2011/0016023 | A1 | 1/2011 | Zakas |
| 2011/0112917 | A1 | 5/2011 | Driessen |
| 2011/0140993 | A1* | 6/2011 | Bess ............................ 345/2.3 |
| 2011/0186656 | A1* | 8/2011 | Cho ........................ E01C 19/20 239/663 |
| 2011/0288938 | A1 | 11/2011 | Cook |
| 2011/0295691 | A1* | 12/2011 | Krieter ............... G01C 21/3697 705/14.58 |
| 2011/0299830 | A1 | 12/2011 | Sasaki |
| 2011/0320278 | A1* | 12/2011 | Littman .................... 705/14.58 |
| 2012/0062475 | A1* | 3/2012 | Locker et al. ................. 345/173 |
| 2012/0077584 | A1 | 3/2012 | Sarmenta |
| 2012/0101885 | A1 | 4/2012 | Lee |
| 2012/0155380 | A1 | 6/2012 | Hodges |
| 2012/0206319 | A1* | 8/2012 | Lucero ............... H04N 21/4788 345/1.3 |
| 2012/0208592 | A1 | 8/2012 | Davis |
| 2012/0218089 | A1 | 8/2012 | Hill |
| 2012/0220220 | A1* | 8/2012 | DeLuca et al. .............. 455/41.1 |
| 2012/0220221 | A1* | 8/2012 | Moosavi et al. ............. 455/41.1 |
| 2012/0224743 | A1 | 9/2012 | Rodriquez et al. |
| 2012/0226573 | A1 | 9/2012 | Zakas |
| 2012/0245988 | A1 | 9/2012 | Pace |
| 2012/0271712 | A1 | 10/2012 | Katzin et al. |
| 2012/0271717 | A1 | 10/2012 | Postrel |
| 2012/0290377 | A1 | 11/2012 | Itani |
| 2013/0002405 | A1* | 1/2013 | Pesonen et al. ............. 340/10.5 |
| 2013/0006869 | A1 | 1/2013 | Grab et al. |
| 2013/0106684 | A1* | 5/2013 | Weast et al. .................. 345/156 |
| 2013/0115851 | A1* | 5/2013 | Setton .................. A63H 33/26 446/397 |
| 2013/0181886 | A1* | 7/2013 | Hill .............................. 345/2.3 |
| 2013/0185137 | A1 | 7/2013 | Shafi |
| 2013/0237147 | A1* | 9/2013 | Dearman .................... 455/41.1 |
| 2013/0300637 | A1 | 11/2013 | Smits et al. |
| 2014/0131452 | A1 | 5/2014 | Testanero |

\* cited by examiner

DYNAMIC TRANSFORMATION OF DISPLAY MEDIA BASED UPON A PROXIMITY-BASED COMMUNICATION PROTOCOL

RELATED APPLICATIONS

This application claims priority to U.S. Provisional Patent Application Ser. No. 61/766,065, filed on Feb. 18, 2013, entitled TRANSFERENCE OF DATA TO PROVIDE CONTENT, which is hereby incorporated by reference in its entirety.

BACKGROUND

1. Field

This disclosure generally relates to the field of data transference.

2. General Background

Media products are typically placed in packaging on store shelves that allow consumers to read information about the content of the media products. Examples of such media products are Blu-ray discs or DVDs with movies, television shows, video games, or the like. The packaging may include colorful artwork, sound effects, and/or the like that may grab the attention of potential consumers. The packaging itself may be of such interest to some consumers that they keep the packaging after purchase of the corresponding product.

In contrast, consumers may purchase many media products online without any packaging. For example, consumers may purchase a movie online and download the movie almost instantly. The consumers are able to obtain the content more quickly than having to travel to the store to buy a product within a package.

Although online consumers are able to purchase media products more quickly than in store customers, online consumers do not receive the corresponding packaging for the media content unless they wait for the package to be mailed to them. Many consumers are purchasing more of their content through online websites rather than through the in-store experience as current packaging configurations have mainly remained stagnant. As a result, stores selling media products have faced newer challenges in maintaining the same base of customers that previously purchased media products from those stores.

SUMMARY

A process detects, at a first proximity-based device within a first object, presence of a second proximity-based device within a second object. The presence is within a proximity. Further, the process modifies a first display associated with the first object based upon a second display associated with the second object.

Further, an apparatus comprises a first proximity-based device corresponding to a first object. The first proximity-based device detects a presence of a second proximity-based device corresponding to a second object, receives a communication from the second proximity-based device that is based upon a proximity-based communication protocol, and modifies a first display associated with the first object based upon the communication, the presence being within a proximity.

Another process detects, at a first proximity-based device within a first product, presence of a second proximity-based device within a second product. The presence is within a proximity. Further, the process modifies a first display associated with a first object corresponding to the first product based upon a second display associated with a second object associated with a second object corresponding to the second product.

Yet another process detects, at a first proximity-based device corresponding to a first object, presence of a second proximity-based device corresponding to a second object. The presence is within a proximity. Further, the process receives, at the first proximity-based device, a communication from the second proximity-based device that is based upon a proximity-based communication protocol. In addition, the process modifies a first display associated with the first object based upon the communication.

BRIEF DESCRIPTION OF THE DRAWINGS

The above-mentioned features of the present disclosure will become more apparent with reference to the following description and accompanying drawings, wherein like reference numerals denote like elements and in which.

DETAILED DESCRIPTION

Figure 1:
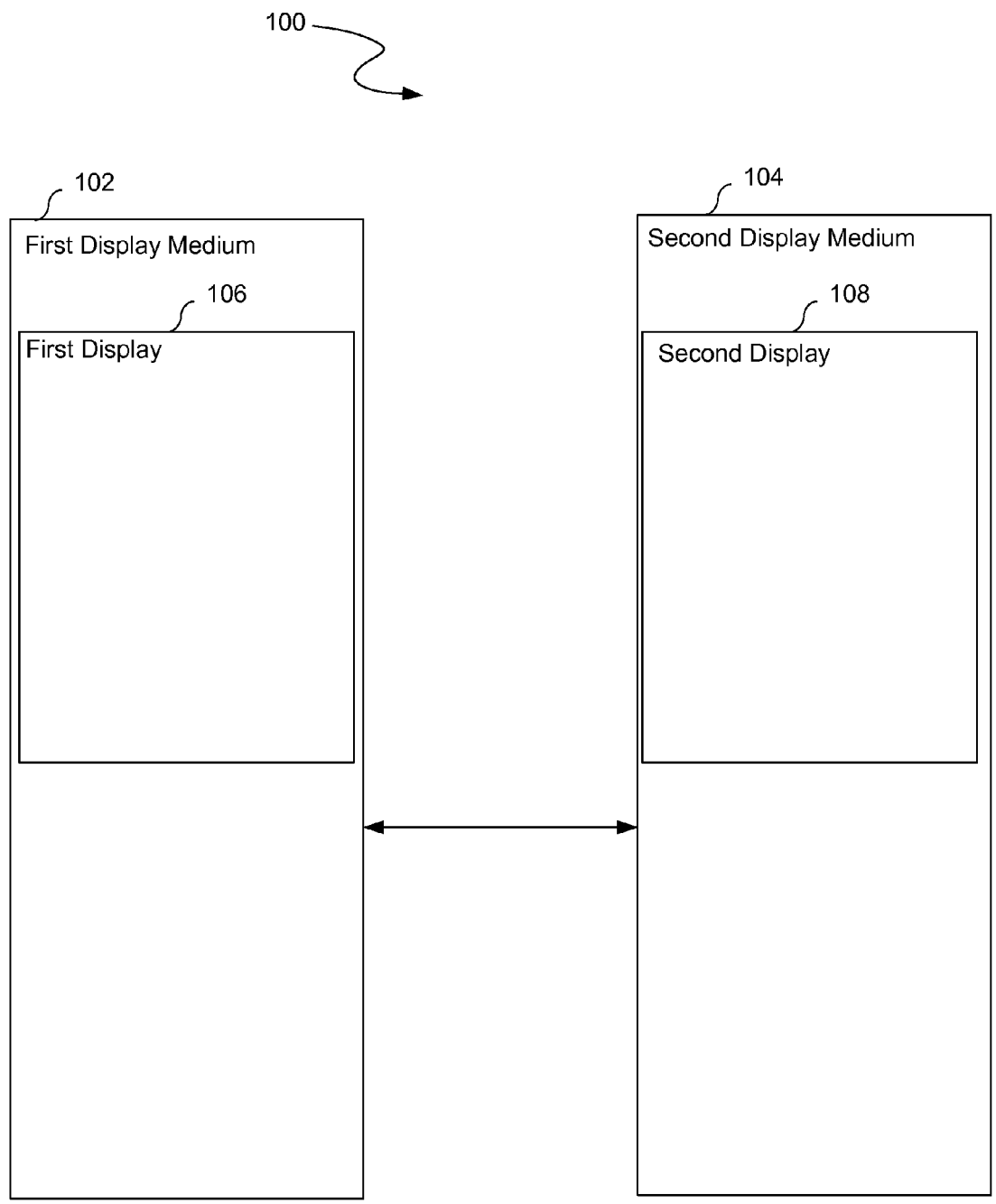
FIG. 1 illustrates a dynamic transformation configuration.

A dynamic transformation configuration transforms display media based upon a proximity-based communication protocol. Display media may be product packages, product covers, product binders, or the like. When the display media are placed within proximity to each other, the proximity-based communication protocol provides a mode of communication for communicating a change in appearance, sound, smell, or the like. For example, two movie products for different movies in a movie series may be placed within corresponding product packages. Those product packages may then be placed within proximity to each other. As a result, the packaging features of either or both packages may be changed. Packaging features may include graphics, e-ink displays, color, smell, and/or the like. For instance, the color of both product packages may be modified as a result of both packages being placed within a predefined proximity of each other.

Accordingly, the display media, e.g., product packages, are more meaningful than previous display media that were static. Users may have more interest in the in-store purchase experience as the display media of the dynamic transformation configuration provides an entertainment experience that is based upon the product packaging. Further, the appearance of a display medium may be modified differently based upon being within proximity to different display media. For example, a product package may turn a particular color when in proximity to a product package in the same movie series and a different color when in proximity to a product package in a different movie series. Therefore, the dynamic transformation configuration provides users with the ability to adapt their entertainment experience with different media packaging.

In one configuration, the packages only change their appearance, sound, smell, or the like after the user purchases the corresponding products. The store checkout device provides a code to a user device, e.g., a mobile device, or the proximity-based devices within the product and/or product package such that the code is utilized to perform validation prior to the modification of the appearance, sound, smell, or the like of the packages. Accordingly, the user is able to modify features of product packages only after purchase in this configuration.

In an alternative configuration, the user is able to modify package features prior to purchase. For example, a user may want to preview the appearance of two particular product packages in the store prior to purchase. The user may then peruse various possible product package combinations in the store prior to purchase. As a result, the user has an incentive to travel to the store to peruse a variety of entertainment experiences provided by the transformative packaging.

The product corresponding to the product packaging may be a media product, e.g., a Blu-ray disc, DVD, video game, or the like. Alternatively, the product may be an entertainment product that is not a media product, e.g., an action figure, a doll, or the like.

FIG. 1 illustrates a dynamic transformation configuration 100. As an example, the dynamic transformation configuration 100 may have two display media, e.g., the first display medium 102 and the second display medium 104. The display medium is an object that corresponds to a product or a service for sale. The display medium provides display data associated with the product or service. Examples of display media are product packages, product covers, product binders, or the like. The display medium has at least a portion that displays the product or service data. For example, the display medium may be a product package that has a printed graphic display for product information, e.g., the front of the product package. As another example, the display may be a light generating display device such as an OLED, LED, LCD, or the like. As yet another example, e-ink may be utilized for the display.

FIG. 1 illustrates the first display medium 102 having a first display 106 and the second display medium 104 having a second display 108. The first display 106 and the second display 108 may be the same or different types of displays.

In one configuration, the first display medium 102 detects the presence of the second display medium 104 within a proximity. In another configuration, the second display medium 104 detects the presence of the first display medium 102 within the proximity. In yet another configuration, both display media each detect the presence of each other within the proximity.

In one aspect, the proximity is predefined. For example, the predefined distance may be established such that a tap of the two display media has to be performed for presence detection. Alternatively, the predefined distance may be a distance that does not have a tap.

A variety of wireless technologies may be utilized for the first display medium 102 to detect the presence of the second display medium 104. Various transmitters, receivers, and/or transceivers may be utilized, e.g., RFID chip, RFID tag, Near Field Communication ("NFC") chip, NFC tag, Bluetooth, or the like. Radio or other communication may be established between the first display medium 102 and the second display medium 104 based upon one or more set of standards, e.g., NFC standards. After communication is established, a dynamic transformation protocol may be utilized between the display media to trigger or communicate transformations to the displays, e.g., the first display 106 and the second display 108.

Although two display media are illustrated in FIG. 1, various other quantities of display media may be utilized. For example, three or more display media may be utilized.

Figure 2:
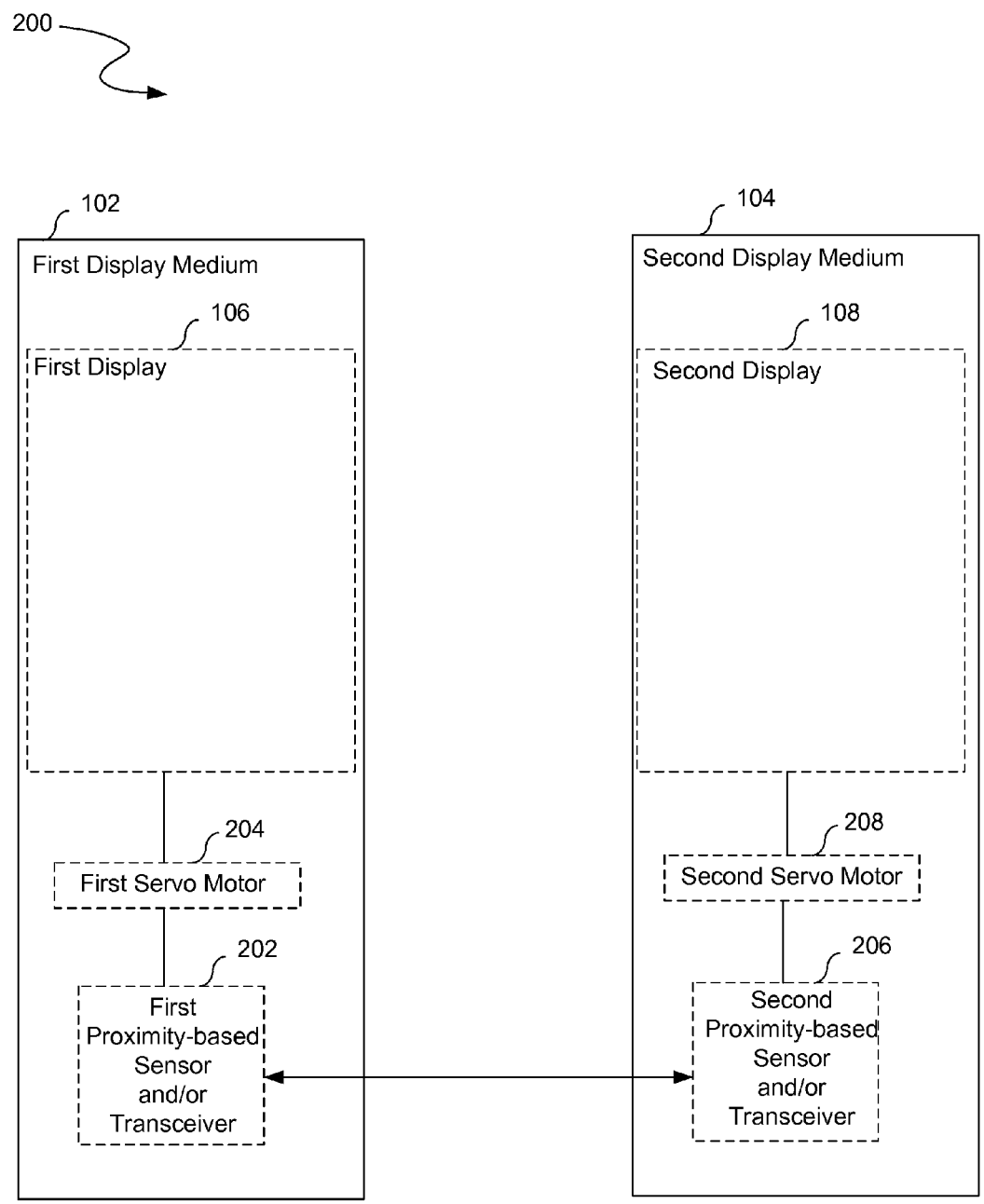
FIG. 2 illustrates the internal components of the first display medium and the second display medium illustrated in FIG. 1.

FIG. 2 illustrates internal components of the first display medium 102 and the second display medium 104 illustrated in FIG. 1. The first display medium 102 has a first proximity-based sensor and/or transceiver 202 that is in operable communication with a first servo motor 204. The first servo motor 204 provides a transformation command to the rear of the first display 106 based upon data received from the first proximity-based sensor and/or transceiver 202. Alternatively, the servo motor 204 may be configured to provide the transformation command to the front or side of the first display 106.

Further, the second display medium 104 has a second proximity-based sensor and/or transceiver 206 that is in operable communication with a second servo motor 208. The second servo motor 208 provides a transformation command to the rear of the second display 108 based upon data received from the second proximity-based sensor and/or transceiver 206. Alternatively, the servo motor 208 may be configured to provide the transformation command to the front or side of the second display 108.

In one configuration, the first display medium 102 detects the presence of the second display medium 104 within the proximity when the first proximity-based sensor and/or transceiver 202 detects the presence of the second proximity-based sensor and/or transceiver 206 within the proximity. In one aspect, a predetermined dynamic transformation protocol is established such that servo motors 204 and 208 are programmed to perform certain actions based upon the detection of particular display media within the proximity. For example, the dynamic transformation protocol may provide that media product package displays 106, 108 corresponding to different media products in the same movie series should change to the color blue when in the media product packages are within proximity to each other. As another example, the dynamic transformation protocol may provide that media product package displays 106, 108 corresponding to different media products in a different movie series should change to the color green when in the media product packages are within proximity to each other.

The servo motors 204 and 208 perform transformative actions based upon receiving data from the corresponding proximity-based sensors and/or transceivers that presence of other proximity-based sensors and/or transceivers has been detected. The preprogrammed servo motors then perform transformative actions accordingly.

In another configuration, the servo motors 204, 208 are not preprogrammed. The proximity-based sensors and/or transceivers 202, 206 may provide actions to be performed to the servo motors 204, 208.

In one aspect, the actions performed by the servo motors 204 and 208 are directly performed by the servo motors 204 and 208 rather than through indirect commands. For instance, the servo motors 204 and 208 may release chemicals onto the displays 106 and 108 to change the appearance, e.g., color, of the displays 106 and 108.

In another aspect, devices other than servo motors 204 and 208 are utilized. For example, processors in display media 102 and 104 may be utilized to perform actions based upon detecting or being notified of detection of another display medium in proximity.

Figure 3A:
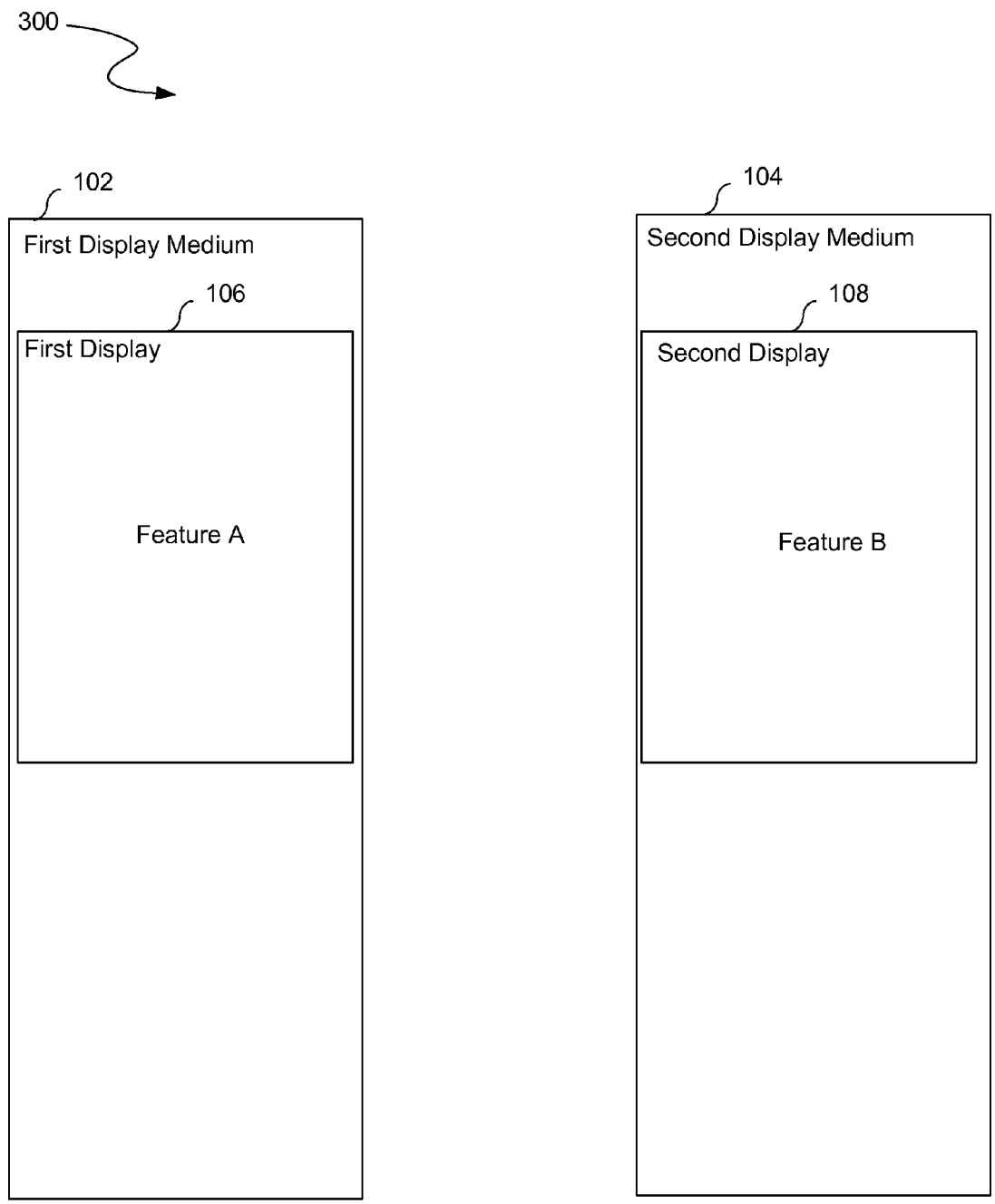
FIG. 3A illustrates an example configuration of the first display of the first display medium and the second display of the second display medium illustrated in FIG. 1.

FIG. 3A illustrates an example configuration 300 of the first display 106 of the first display medium 102 and the second display 108 of the second display medium 104 illustrated in FIG. 1. Prior to being within proximity of each other, the first display medium 102 displays a feature A, whereas the second display medium 104 displays a feature B. For instance, the first display medium 102 may have a cover that has a blue color, whereas the second display medium 104 may have a cover that is a green color. The features are not limited to colors. The features may alternatively be graphic artwork, characters from the content associated with products stored in the display media, text, videos, and/or the like. Further, the display media 102 and 104 may provide various features without the displays 106 and 108. For instance, the display media 102 and 104 may have audio features, olfactory features, and/or the like. Accordingly, audio devices, chemicals, or the like may be utilized in combination with or in the alternative to display devices.

As another example of the features A and B, the first feature A may include a graphic representation of a character corresponding to content associated with the first display 106, whereas the second feature B may include a graphic representation of a character corresponding to content associated with the second display 108. As yet another example, the first feature A may include text corresponding to content associated with the first display 106, whereas the second feature B may include text corresponding to content associated with the second display 108.

Figure 3B:
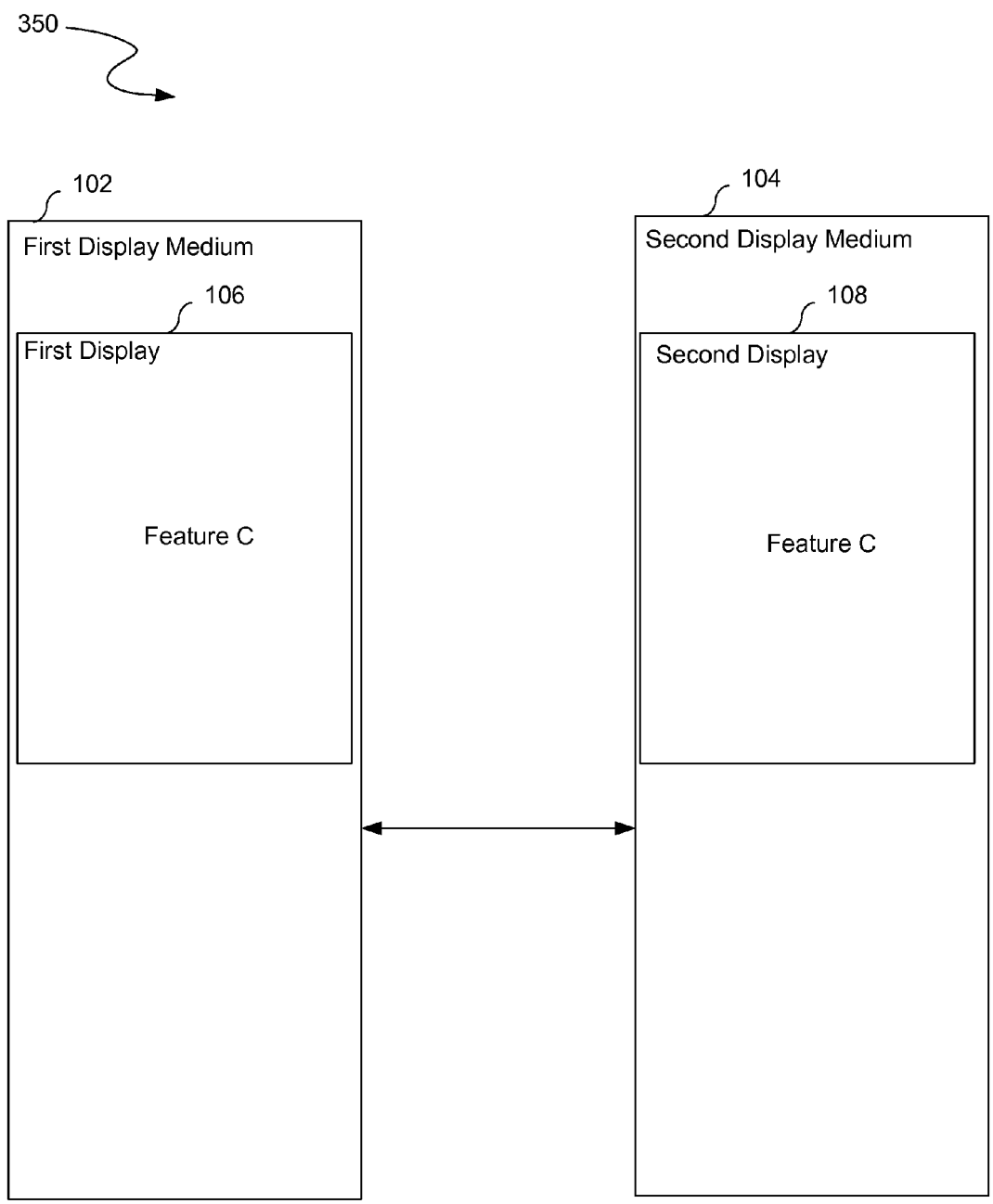
FIG. 3B illustrates an example configuration of the first display of the first display medium and the second display of the second display medium illustrated in FIG. 3A after the first display medium and the second display medium are in proximity to each other as detected by either or both of the display media.

FIG. 3B illustrates an example configuration 350 of the first display 106 of the first display medium 102 and the second display 108 of the second display medium 104 illustrated in FIG. 3A after the first display medium 102 and the second display medium 104 are in proximity to each other as detected by either or both of the display medium 102 and the display medium 104. As a result of such proximity, either or both of the display media 102 and 104 may perform a dynamic transformation of the corresponding displays 106 and 108, audio devices, olfactory devices, or the like.

Utilizing the example where the first feature A illustrated in FIG. 3A is blue and the second feature B illustrated in Figure B is green, the first display medium 102 and/or the second display medium 104 may perform dynamic transformations of their corresponding displays 106 and 108 to display the feature C as white. Utilizing the example where the first feature A may include a graphic representation of a character corresponding to content associated with the first display 106, and the second feature B may include a graphic representation of a character corresponding to content associated with the second display 108, the first display medium 102 and/or the second display medium 104 may perform dynamic transformations of their corresponding displays 106 and 108 to display the feature C as a graphic representation that includes both characters. For instance, the content associated with each of the display media 102 and 104 may correspond to two different favorite movie characters of a user. The feature C may provide a graphic representation that illustrates both movie characters so that the user may customize a group of movies into a particular category for that particular user's favorite movies.

As yet another example, the content associated with the display media 102 and 104 may be different movies for a particular movie series with the same characters. The first feature A and the second feature B may each have graphic artwork, but the feature C may provide common graphic artwork for the series that may be obtained when the display media 102 and 104 are in proximity to each other. For example, fans of a particular series may only be able to obtain a particular cover for a series by purchasing the entire series and placing each product package in proximity to each other. Therefore, fans have an incentive to purchase products with the product packages.

As another example, various audio experiences may be provided. For example, a series theme song may be utilized in place of individual movie theme songs when the display media 102 and 104 are within proximity to each other.

Figure 3C:
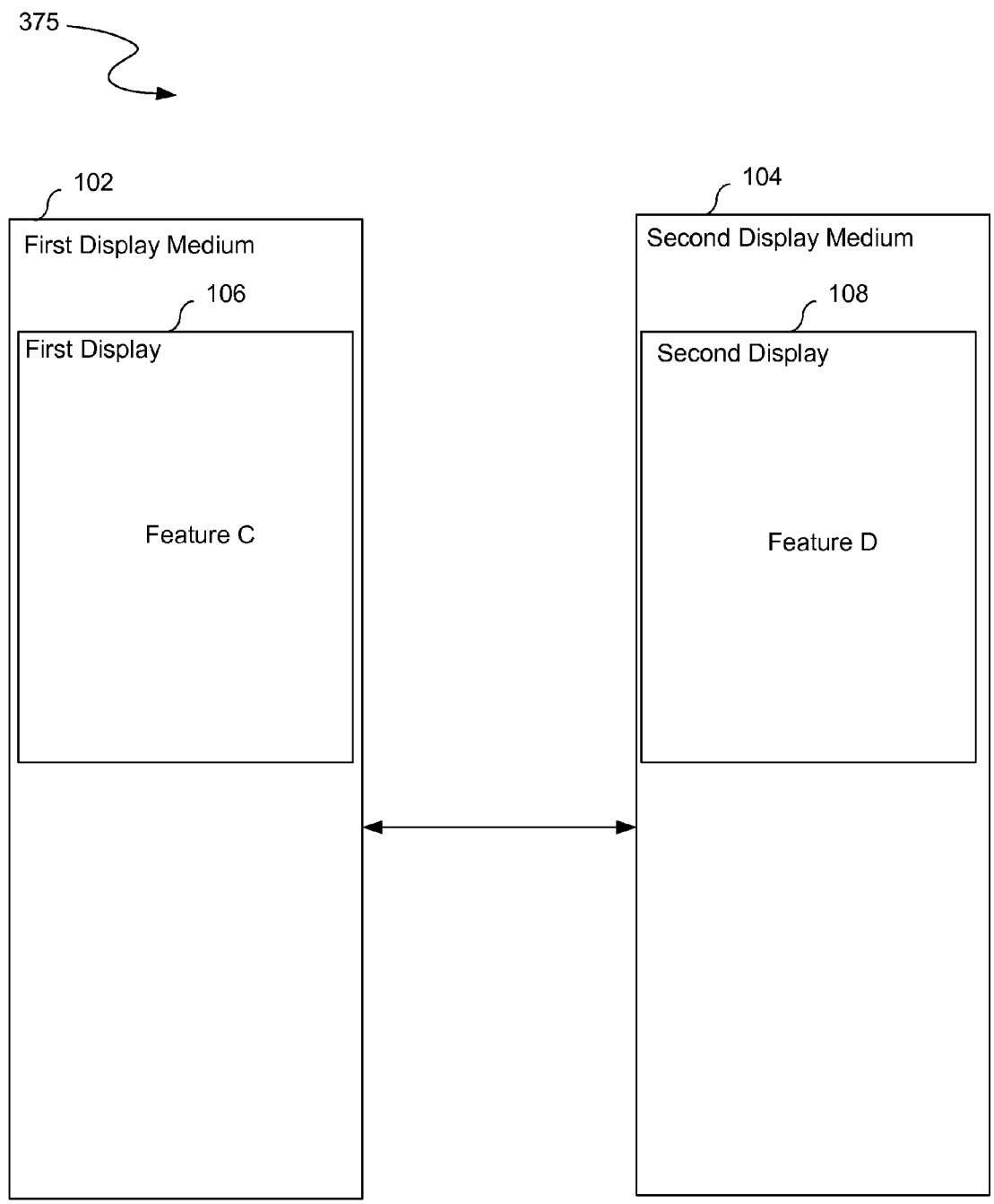
FIG. 3C illustrates an alternative example configuration of the first display of the first display medium and the second display of the second display medium illustrated in FIG. 3A after the first display medium and the second display medium are in proximity to each other as detected by either or both of the display media.

FIG. 3C illustrates an alternative example configuration 375 of the first display 106 of the first display medium 102 and the second display 108 of the second display medium 104 illustrated in FIG. 3A after the first display medium 102 and the second display medium 104 are in proximity of each other as detected by either or both of the display medium 102 and the display medium 104. Instead of the same feature resulting from dynamic transformation for both display media 106 and 108, e.g., feature C, two different features may result from the dynamic transformation, e.g., feature C and feature D. For example, common graphic artwork with different text pertaining to different sets of content may be utilized for feature C and D. Further, different colors, audio, smells, and/or the like may be utilized.

Figure 4:
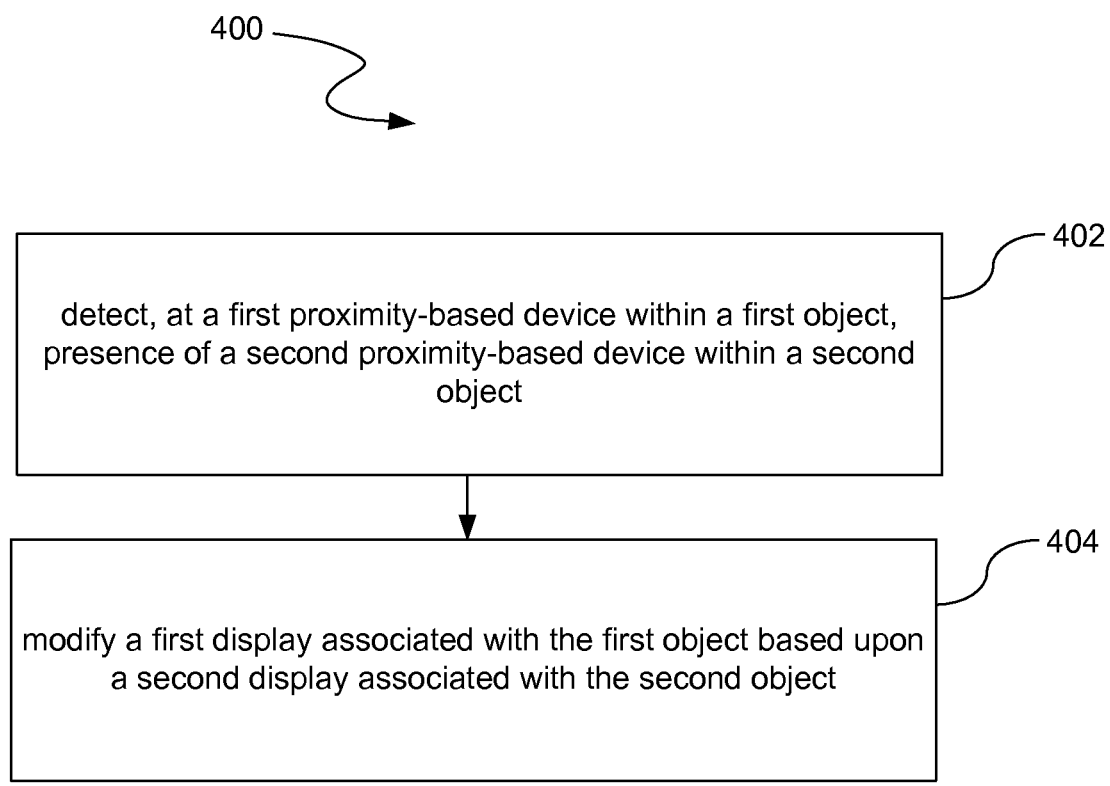
FIG. 4 illustrates a process that may be utilized by a first object to detect the presence of a second object.

FIG. 4 illustrates a process 400 that may be utilized by a first object to detect the presence of a second object. At a first process block 402, the process 400 detects, at a first proximity-based device within a first object, presence of a second proximity-based device within a second object. The presence is within a proximity. Further, at a process block 404, the process 400 modifies a first display associated with the first object based upon a second display associated with the second object. Although the first display is modified, the second display may or may not be modified.

Figure 5:
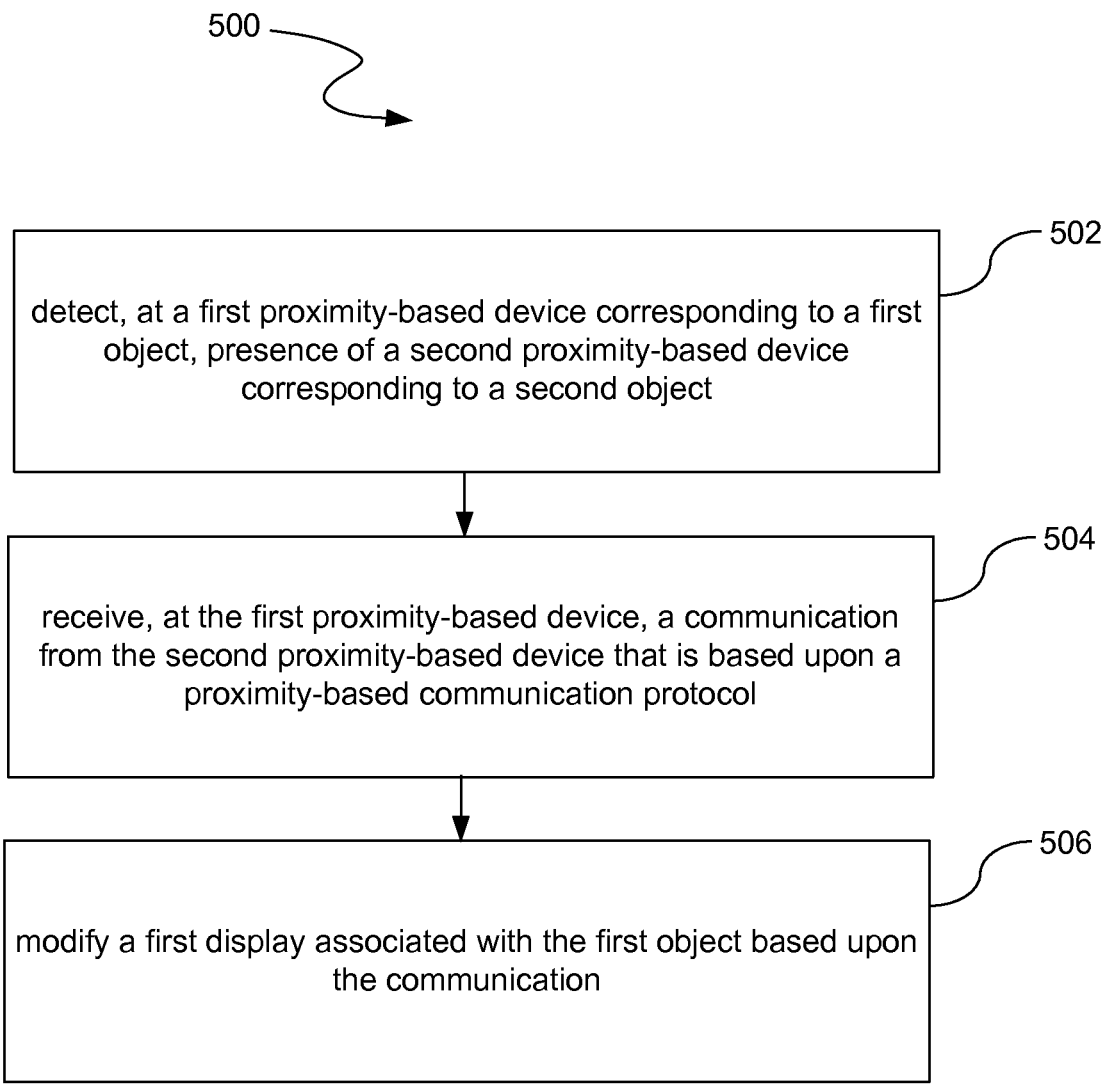
FIG. 5 illustrates an alternative process that may be utilized by a first object to detect the presence of a second object.

FIG. 5 illustrates an alternative process 500 that may be utilized by a first object to detect the presence of a second object. At a first process block 502, the process 500 detects, at a first proximity-based device corresponding to a first object, presence of a second proximity-based device corresponding to a second object. The presence is within a proximity. Further, at a process block 504, the process 500 receives, at the first proximity-based device, a communication from the second proximity-based device that is based upon a proximity-based communication protocol. In addition, at a process block 506, the process 500 modifies a first display associated with the first object based upon the communication.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
   detecting, at a first proximity-based device within a first product package, presence of a second proximity-based device within a second product package, the presence being within a proximity, the first product package storing a first media product, the second product package storing a second media product; and
   modifying a first display associated with the first product package based upon a second display associated with the second product package to have a feature that is common to the first display and the second display without modifying a position of an additional feature that is distinct between the first display and the second display, the feature being associated with the first media product and the second media product.

2. The method of claim 1, wherein the first display is modified by modifying a color of the first display.

3. The method of claim 1, wherein the first display is modified by modifying a smell of the first display.

4. The method of claim 1, wherein the first display is a first light generating display and the second display is a second light generating display.

5. The method of claim 1, wherein the first proximity-based device is a first Near Field Communication transceiver and the second proximity-based device is a second Near Field Communication transceiver.

6. The method of claim 1, wherein the modification is performed through release of a chemical stored by the first object.

7. The method of claim 6, wherein the modification is performed through a change in e-ink.

8. The method of claim 1, wherein the proximity is predefined.

9. An apparatus comprising:
   a first proximity-based device corresponding to a first product package, the first proximity-based device detecting a presence of a second proximity-based device corresponding to a second product package, receiving a communication from the second proximity-based device that is based upon a proximity-based communication protocol, and modifying a first display associated with the first product package based upon the communication to have a feature that is common to the first display and a second display corresponding to the second object without modifying a position of an additional feature that is distinct between the first display and the second display, the presence being within a proximity, the communication comprising a transformation command, the first product package storing a first media product, the second product package storing a second media product, the feature being associated with the first media product and the second media product; and
   a servo motor that sends the communication to the first display to perform the modification of the first display.

10. The apparatus of claim 9, wherein the first display is modified by modifying a color of the first display.

11. The apparatus of claim 9, wherein the first display is modified by modifying a smell of the first display.

12. The apparatus of claim 9, wherein the first display is a first light generating display.

13. The apparatus of claim 9, wherein the first proximity-based device is a first Near Field Communication transceiver and the second proximity-based device is a second Near Field Communication transceiver.

14. The apparatus of claim 9, wherein the modification is performed through release of a chemical stored by the first object.

15. The apparatus of claim 14, wherein the modification is performed through a change in e-ink.

16. The apparatus of claim 9, wherein the proximity is predefined.

17. A method comprising:
   detecting, at a first proximity-based device corresponding to a first product package, presence of a second proximity-based device corresponding to a second product package, the presence being within a proximity, the first product package storing a first media product, the second product package storing a second media product;
   receiving, at the first proximity-based device, a communication from the second proximity-based device that is based upon a proximity-based communication protocol; and
   modifying a first display associated with the first product package based upon the communication to have a feature that is common to the first display and a second display corresponding to the second product package without modifying a position of an additional feature that is distinct between the first display and the second display, the feature being associated with the first media product and the second media product.

* * * * *